United States Patent [19]

Larikka

[11] 4,455,015
[45] Jun. 19, 1984

[54] STEERING APPARATUS FOR AN AUTOGENOUS CUTTING TORCH

[75] Inventor: Leo Larikka, Palosaarentie 13-17 A 7, 65200 Vaasa 20, Finland

[73] Assignee: Leo Larikka, Vaasa, Finland

[21] Appl. No.: 483,947

[22] PCT Filed: Sep. 13, 1982

[86] PCT No.: PCT/FI82/00035
§ 371 Date: Mar. 21, 1983
§ 102(e) Date: Mar. 21, 1983

[87] PCT Pub. No.: WO83/01026
PCT Pub. Date: Mar. 31, 1983

[30] Foreign Application Priority Data

Sep. 14, 1981 [FI] Finland .................................. 812851

[51] Int. Cl.³ .......................... B23K 7/02; B23K 7/04
[52] U.S. Cl. ...................................... 266/54; 266/55; 266/70; 266/72
[58] Field of Search .................. 266/54, 55, 72, 70

[56] References Cited

U.S. PATENT DOCUMENTS

| | | |
|---|---|---|
| 2,182,707 | 12/1939 | Shipman . |
| 2,583,002 | 1/1952 | Maxon, Jr. . |
| 2,910,289 | 10/1959 | Grubish . |
| 3,451,666 | 6/1969 | Evans . |
| 4,256,288 | 3/1981 | Rojas ..................................... 266/72 |
| 4,265,430 | 5/1981 | Eriksson et al. ...................... 266/54 |
| 4,411,410 | 10/1983 | Sumner ................................ 266/54 |

FOREIGN PATENT DOCUMENTS

| | | |
|---|---|---|
| 875901 | 5/1953 | Fed. Rep. of Germany . |
| 1303453 | 8/1962 | France . |
| 419607 | 8/1981 | Sweden . |
| 1043953 | 9/1966 | United Kingdom . |

Primary Examiner—W. Stallard
Attorney, Agent, or Firm—Mason, Kolehmainen, Rathburn & Wyss

[57] ABSTRACT

A steering apparatus for an autogenous cutting torch for cutting holes of desired shape in flat or curved sheet walls, such as in the wall of a pipe. The steering apparatus comprises a holder arm for an autogenous cutting torch and means for guiding the holder arm in a manner that the autogenous cutting torch can be run along a certain desired orbit or path. A problem with the prior art steering equipment is the limited scope of application, e.g. to the cutting of flat sheets only. In order to expand the scope of application to also cover curved surfaces as well as combinations of flat and curved surfaces, the holder arm is designed as a long rod (4), arranged to be axially displaceable on a slide guide (7). The steering movement of an autogenous cutting torch crosswise relative to holder arm (4) is arranged to be effected by means of steering elements (9, 10, 12, 19) engaging the holder arm at a distance from cutting torch (3) and turning said holder arm (4) around its longitudinal axis and/or displacing holder arm (4) in its transverse direction, on a slide guide which is perpendicular to said slide guide (7).

11 Claims, 4 Drawing Figures

STEERING APPARATUS FOR AN AUTOGENOUS CUTTING TORCH

The present invention relates to a steering apparatus for an autogenous cutting torch for cutting a hole of desired shape in a wall, such as the wall of a pipe or a flat sheet, said steering apparatus comprising a holder arm for the autogenous cutting torch and means for steering the holder arm so as to guide the autogenous cutting torch along a certain desired path.

Previously known is to autogenously cut out pieces of a desired template shape from a flat sheet by employing a steering device, wherein a magnetic roller rolls along the edges of a template having desired shape while simultaneously carrying the holder arm of an autogenous cutting torch. A drawback of this steering device is that it is only capable of cutting flat or planar sheets. However, there is a need to cut holes of various sizes both in curved wall surfaces and in the combinations of curved and flat surfaces. One example of this is cutting of an oval hole in the side of a pipe when the purpose is to form a collar for a branching joint by pulling the hole edges upwards. In this case, the hole to be cut must be oval longitudinally of the pipe in order to bring edges of the eventual collar essentially onto the same level. Another noteworthy example is cutting of check gates or manholes in the side of containers of various shapes, whereby the wall to be cut can be partially flat and partially, e.g. at its edges, curved. Heretofore, there has not been available a steering apparatus for an autogenous cutting torch, which would be suitable for cutting holes of desired shapes both in flat and curved wall surfaces.

An object of the invention is to eliminate this drawback and, according to the invention, this has been accomplished by means of a surprisingly simple design of a steering apparatus. A steering apparatus of the invention is characterized in that the holder arm consists of an elongate holder bar mounted for axial displacement on a slide control, the motion of an autogenous cutting torch crosswise relative to the holder arm being effected by means of steering elements engaging the holder arm at a distance from the autogenous storch, said elements rotating the holder arm around its longitudinal axis and/or displacing the holder arm crosswise, supported by a slide control perpendicular to the above-mentioned slide control.

The essence of a solution of the invention is thus the use of an elongate holder arm, said holder arm being selectively or as various combinations settable in (1) controlled axial movement, (2) rotating motion dependent on axial movement, and (3) movement perpendicular to axial direction.

The invention will now be illustrated in more detail by means of work examples with reference made to the accompanying drawings, in which FIG. 1 is a perspective view of a steering apparatus for an autogenous cutting torch according to a first embodiment of the invention for cutting an oval hole in a pipe.

Figure 1:
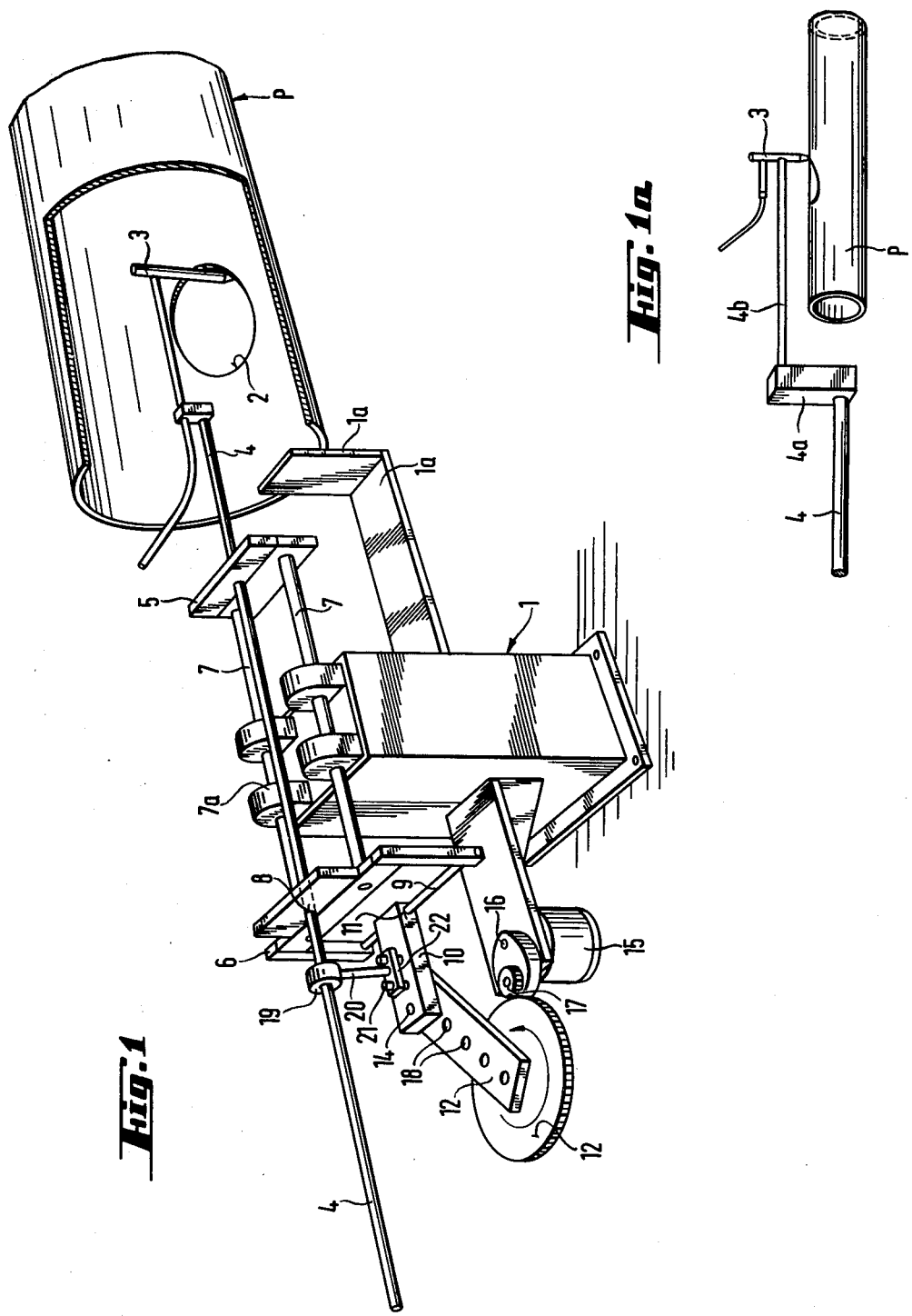
FIG. 1A shows an alternative mounting of an autogenous torch for cutting an oval hole in the outer face of a pipe.

Referring to FIG. 1, a pipe P is to be provided with an oval hole 2 and supported on a stand, not shown. The end of pipe P is placed against a back stop 1a extending from the body of a steering apparatus 1. An autogenous cutting torch 3 is mounted on the end of a holder arm 4 provided by an elongate rod, so that the radial distance of a torch nozzle from the axial extension of holder arm 4 is adjustable for adapting the apparatus to various pipe diameters.

FIG. 1 shows cutting of an oval hole in a pipe from the interior of the pipe. Thus, the autogenous cutting debris shall not remain inside the pipe. However, it is often preferable and, when dealing with small pipes, for practical reasons necessary to effect the cutting from the exterior of a pipe. FIG. 1A shows an autogenous cutting torch 3 and its mounting arrangement for this purpose. Thus, the end of arm 4 is fitted with a radial distance or spacer element 4a to which is secured an auxiliary arm 4b, which is parallel to arm 4 and radially spaced from the extension of the axis of arm 4. The cutting torch 3 is mounted on the end of arm 4b so that its torch nozzle will be at a desired distance from the extension of the axis of arm 4 directed towards said extension of axis.

Holder arm 4 is journaled to frames 5 and 6 to be rotatable around its axis and axially displaceable. However, the axial displacement can be locked e.g. by means of a screw fitted in the inner rim of a bearing 8. Frames 5 and 6 are connected with each other by slide rods 7 which are axially slideably supported on the body 1 by means of slide bearings 7a.

Frame 6 carries a transverse slide rod 9 which extends through a slide hole 11 in a slide element 10.

An assembly 12, provided by a gear wheel and an arm mounted thereon, is arranged to be rotated around a fixed vertical axle 13 by means of a small gear 17 driven by a motor 15 through a reduction gear 16. The arm of assembly 12 is articulated to slide element 10 by means of a pivot 14. The arm of said rotatable assembly 12 is provided with holes 18 so that the distance of pivot 14 from axle 13 can be selected. Instead of the stepped adjustment, it is naturally possible to use stepless slide adjustment in order to adjust the distance between axle 13 and pivot 14.

Holder arm 4 carries an intermediate element 19 through which arm 4 is displaceable and lockable in a desired position. Thus, the intermediate element 19 and the inner rim of bearing 8 can be connected to each other so that they both can be locked on arm 4 at the same time. The cooperation between the intermediate element 19 and the slide element 10 will be further described hereinbelow with reference made to FIG. 3.

Figure 3:
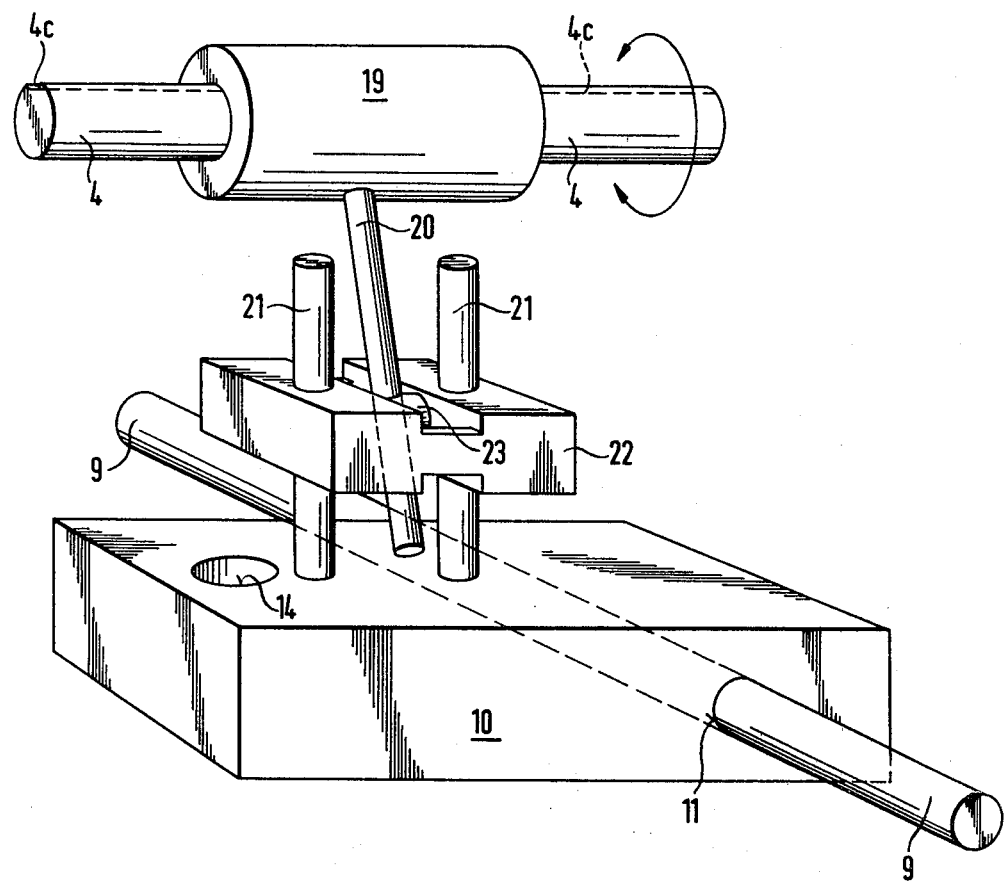
FIG. 3 shows a detail of the steering apparatus as depicted in FIGS. 1 and 2.

As shown in FIG. 3, the intermediate element 19 is fitted with a lever arm 20 extending through an adjustment element 22. The adjustment element 22 can be locked at a desired level on pins 21 projecting from the slide element 10. The adjustment element 22 is provided with a cylinder member 23 which is turnable around the longitudinal axis and through which the lever arm 20 is slideable.

Operation of the apparatus is explained in the following. The radial distance of the nozzle of an autogenous cutting torch 3 from the axial extension of holder arm 4 is adjusted according to the diameter of pipe P, i.e. to be slightly less than the internal diameter of pipe P. In the support stand, pipe P is pushed so as to surround the autogenous cutting torch 3 and the end of its holder arm 4 until it engages the back stop 1a. Holder arm 4 is displaced axially relative to frames 5 and 6 as well as relative to the intermediate element 11 until a desired distance of the center of an eventual hole 2 from back stop 1a can be verfied from a measuring scale 4a on holder arm 4. Thereafter, arm 4 is locked to be axially immovable relative to frame 6 e.g. by means of a screw fitted in the inner rim of bearing 8. Motor 15 is actuated whereby, while rotating around axle 13, said assembly 12 carries slide element 10 transversely along slide rod 9 and at the same time it carries slide rod 9 together with its frame 6 and holder arm 4 in axial direction. The distance between axle 13 and pivot 14 determines the length of the major axis of an oval hole 2. The level of adjustment element 22 determines the turning angle of arm 4 or the width of hole 2. While the nozzle of an autogenous cutting torch 3 travels along the desired oval path, the cutting flame is lit and the hole is run.

Figure 2:
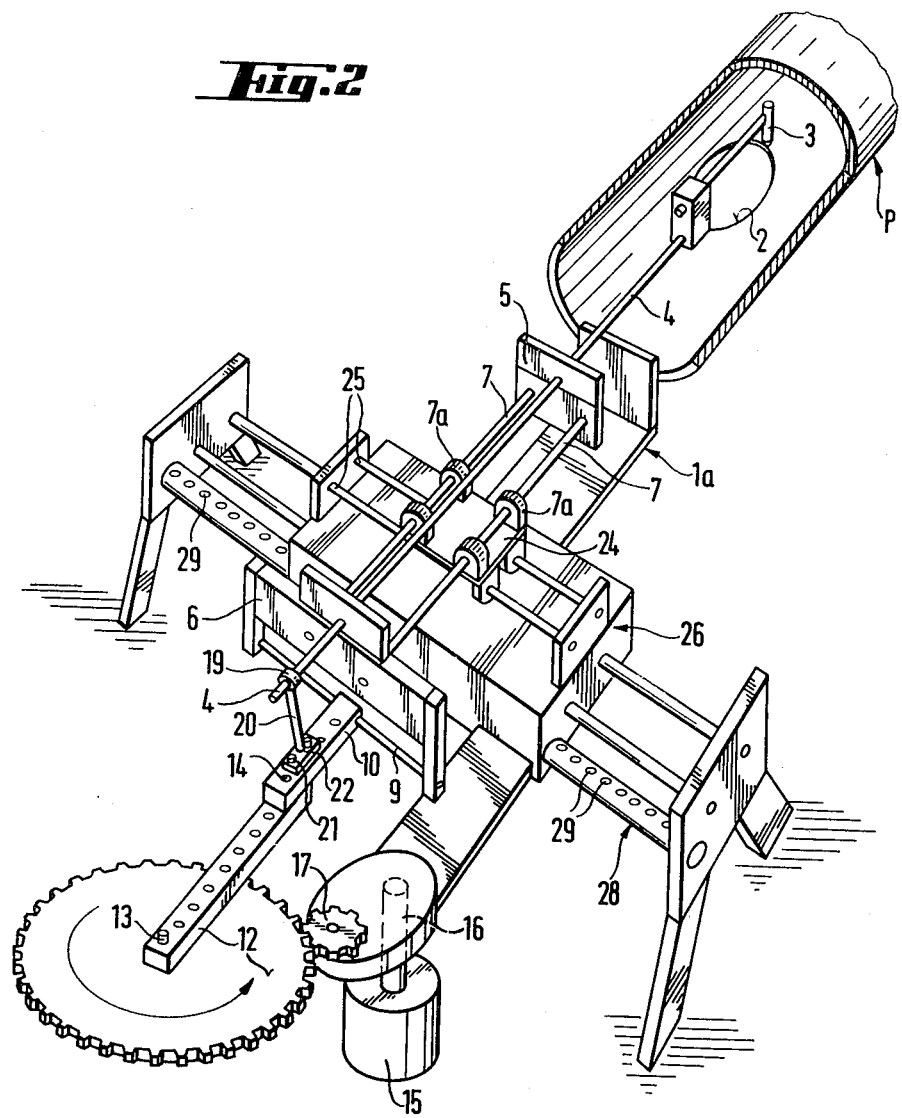
FIG. 2 shows a further developed embodiment capable of cutting both oval and circular holes both in curved and flat walls.

FIG. 2 shows a further development of the invention for cutting holes both in curved and flat surfaces and also in combinations of flat and curved surfaces. For this purpose, the sliding sleeves 7a of slide rods 7 are mounted on a cradle 24 which is displaceable on slide guides 25 in a direction perpendicular to arm 4. If the movement of cradle 24 on slide rods 25 is locked, the operation complies with the case illustrated in FIG. 1 and the apparatus can be used, as explained, to work an oval hole in the wall of a pipe P. However, if cradle 24 is released to travel on slide rods 25 and, in addition to this, the movement of slide element 10 on slide guide 9 is locked, it is possible to make circular holes in a flat sheet. The operating characteristics of the apparatus will be particularly versatile due to the fact that slide element 10 on frame 6 can be replaced by a fixed template whose outline corresponds to that of the hole to be cut. Gear 17 is replaced by a magnetic roller, said template running around the roller while the latter rotates in its fixed position.

Thus, the embodiment shown in FIG. 2 can be used to cut circular holes in a flat sheet without a template, e.g. for making annular flanges and, by means of a template, shaped pieces of a desired pattern or outline. Thus it is preferable that removal of the pieces from the sheet can be effected without moving the latter. For this purpose, the transverse slide guides 25 are mounted on a cradle unit 26 supported on a transverse slide guide unit 28 which, in effect, provides the actual fixed body for the apparatus. During the intervals between the cutting operations, said cradle unit 26 in arranged to move along the slide guide unit 28 e.g. over a hole distance 29, which corresponds to the distance between the pieces to be cut off the sheet.

I claim:

1. A steering apparatus for an autogenous cutting torch for cutting a hole of desired shape in a wall, such as in the wall of a pipe or in a flat sheet, said steering apparatus comprising a holder arm for an autogenous cutting torch (3) and means for steering the holder arm so as to guide the autogenous cutting torch along a determined orbit, characterized in that the holder arm comprises an elongated holder rod (4), arranged for axial displacement on a slide guide (7), and that the movement of an autogenous cutting torch crosswise relative to holder arm (4) is arranged to be effected by means of control elements engaging said holder arm at a distance from the cutting torch (3), said elements turning the holder arm (4) around its longitudinal axis and/or displace said holder arm (4) in its transverse direction on a slide guide (25) perpendicular relative to said slide guide (7).

2. A steering apparatus for an autogenous cutting torch as set forth in claim 1, characterized in that the control elements, rotating holder arm (4) around its longitudinal axis and displacing it in axial direction, comprise an assembly (12) rotatable around a fixed vertical axle (13) and a slide element (10) displaceable along a transverse slide guide (9), said rotatable assembly (12) and slide element (10) being journaled (14) to each other in a manner that, while the former (12) rotates, the latter (10) travels back and forth on its slide guide (9) and simultaneously moves said slide guide (9) back and forth in axial direction of holder arm (4), said slide guide (9) being lockable on holder arm (4) so as to be axially immovable, and that to holder arm (4) is secured an intermediate element (19, 20) which is in engagement with slide element (10).

3. A steering apparatus as set forth in claim 2, characterized in that the slide guide (9) of said slide element (10) is mounted on a frame (6) to which the slide rods (7) for the axial slide steering of holder arm (4) are secured and to which holder arm (4) is rotatably journaled.

4. A steering apparatus as set forth in claim 3, characterized in that said holder arm (4) carries a measuring scale (4a) selected in a manner that the position of said intermediate element (19) or frame (6) on the measuring scale determines the distance of the center of an eventual hole (2) from the back stop (1a) of a work piece.

5. A steering apparatus as set forth in claim 3, characterized in that the frame (6), which is mounted on holder arm (4), is fitted with a template which corresponds to the shape to be cut and whose edge is arranged to follow a rotatable, immovable magnetic roller.

6. A steering apparatus as set forth in claim 3, characterized in that said slide element (10) is provided with a vertically displaceable, at various levels lockable adjustment element (22) by means of which it is possible to adjust the length of the lever arm (20) of an intermediate element (19) mounted on the holder arm, whereby the same transverse travelling distance of slide element (10) leads to a different turning angle of holder arm (4).

7. A steering apparatus as set forth in claim 3, characterized in that a pivot (14) between said rotatable assembly (12) and slide element (10) can be set at various distances (18) from the rotating axis (13) of said rotatable assembly (12).

8. A steering apparatus as set forth in claim 1, characterized in that the radial distance of a torch nozzle from the axial extension of holder arm (4) is adjustable.

9. A steering apparatus as set forth in claim 2, characterized in that slide element (10) can be locked immovably on slide guide (9).

10. A steering apparatus as set forth in claim 1, comprising a slide guide (25) perpendicular to the axial direction of holder arm (4), characterized in that said perpendicular slide guide (25) is lockable.

11. A steering apparatus as set forth in claim 1, characterized in that said torch nozzle (3) is mounted at a distance from the axial extension of holder arm (4) in a manner that it is directed towards this axial extension (FIG. 1A).

* * * * *